United States Patent [19]
Catalano

[11] 3,848,732
[45] Nov. 19, 1974

[54] RIVETED MODULAR CONVEYOR

[75] Inventor: James A. Catalano, Chicago, Ill.

[73] Assignee: Continental Can Company, Inc., New York, N.Y.

[22] Filed: May 1, 1972

[21] Appl. No.: 249,335

[52] U.S. Cl. ................................ 198/204, 198/182
[51] Int. Cl. ............................................. B65g 15/60
[58] Field of Search ............................ 198/182, 204

[56] References Cited
UNITED STATES PATENTS

| | | | |
|---|---|---|---|
| 2,200,116 | 5/1970 | Maguire | 198/204 |
| 2,253,761 | 8/1941 | Campbell | 198/204 |
| 2,726,779 | 12/1955 | Kendall | 198/182 X |
| 3,508,642 | 4/1970 | Standley | 198/208 X |
| 3,596,752 | 8/1971 | Garvey | 198/182 |
| 3,647,051 | 3/1972 | Didas | 198/204 |
| 3,666,082 | 5/1972 | Riggs | 198/204 |

Primary Examiner—Richard A. Schacher
Assistant Examiner—Jeffrey V. Nase
Attorney, Agent, or Firm—Joseph E. Kerwin; William A. Dittmann

[57] ABSTRACT

A modular type conveyor frame structure having precisely located holes in the ends of each module. The holes are positioned so that the holes of adjacent modules lines up exactly. The modules are made straight and curved, the crosssection of each module is designed for maximum strength and rigidity.

12 Claims, 6 Drawing Figures

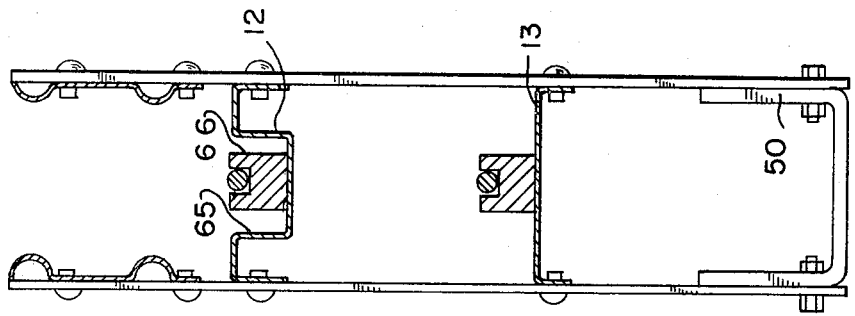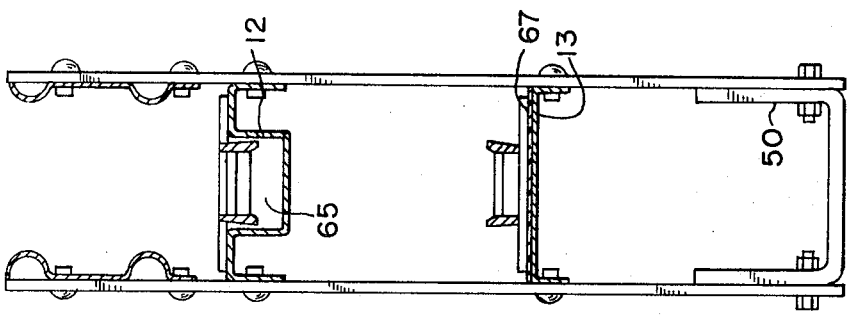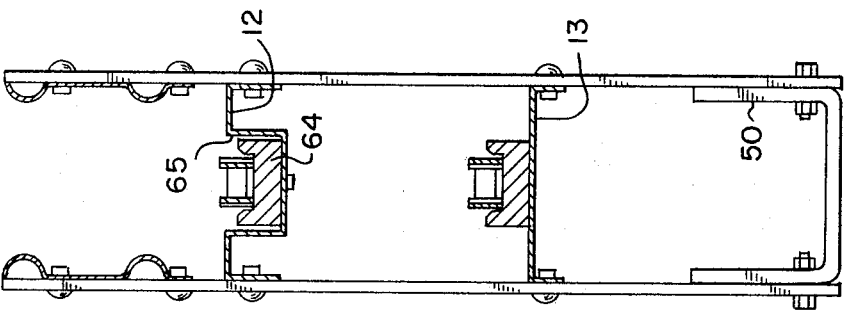

RIVETED MODULAR CONVEYOR

My invention relates to a conveyor frame structure used for the passage of objects from one location to another, and especially to a modular type conveyor frame structure for a live conveyor to move cans or can bodies from one location to another with a minimum of wear or breakage.

Conveyors in the prior art have been assembled from frames and guide rails. An example of such a conveyor and guide rail is the patent to F. E. Fauth, U.S. Pat. No. 3,491,873, granted Jan. 27, 1970. This patent shows a conveyor frame having its parts exposed to facilitate cleaning with guide rails made of an elongated rigid rail with removable facing. Fauth also shows a trough for carrying away water used for washing the conveyor. Accordingly, there exists in the art need for the lightweight, readily cleanable, modular live conveyor of rigid construction and made of easily prepared materials.

Another example is found in the patent to R. R. Szatkowski et al., U.S. pat. No. 3,253,696, issued May 31, 1966. This patent shows fabricated channel sections for supporting belt conveyors. It uses honeycomb structure in the base element to provide a channel-shaped supporting section. This patent also shows a modular construction. Similarly, the patents to W. S. Campbell, U.S. Pat. No. 2,251,761 granted Aug. 26, 1941 and the patent to Francis J. Garvey, U.S. Pat. No. 3,596,752, granted Aug. 3, 1971 show conveyor systems designed for lightness and strength.

It is an object of this invention to provide a light, easily assembled modular live conveyor.

It is another object of this invention to provide a conveyor with alternate drive elements to provide gentle handling, minimum damage and jam-proof environments.

It is a final object of my invention to provide a system adaptable to a variety of conveyor situations.

In brief, my invention comprises a conveyor frame structure having longitudinal rails made of stainless steel or other noncorrosive material in sections. In cross-section, my conveyor has opposed chain carryways and the chain support which provide a forward and return support for the conveyor. These carryways provide support and also provide lateral rigidity for the conveyor. The chain carryway has a groove in its center which is adapted to receive fittings for a variety of drive elements to be used depending on the particular situation. The conveyor line is virtually jam proof to assure continuous product flow.

The conveyor frame structure is readily adapted to 180 degree live turntables, 90 degree turns and 180 degree live parallel turns.

The above and other objects will appear hereinafter and the nature of the invention will be more clearly understood by reference to the following detailed description and the accompanying drawings.

IN THE DRAWINGS

FIG. 3 shows a side view of a straight modular section similar to the view of FIG. 1.

FIG. 4 shows a cross-section taken along the line A—A of FIG. 3 with a honed chain and its adapter in the upper channel way and lower return support adapter.

FIG. 5 shows a cross-section of my invention taken along the line A—A of FIG. 3 with a slat chain and an adapter in the upper support member.

FIG. 6 shows a cross-section of my invention taken along the line A—A of FIG. 3 with a cable and a cable supporting insert mounted on the support and return support.

Figure 1:
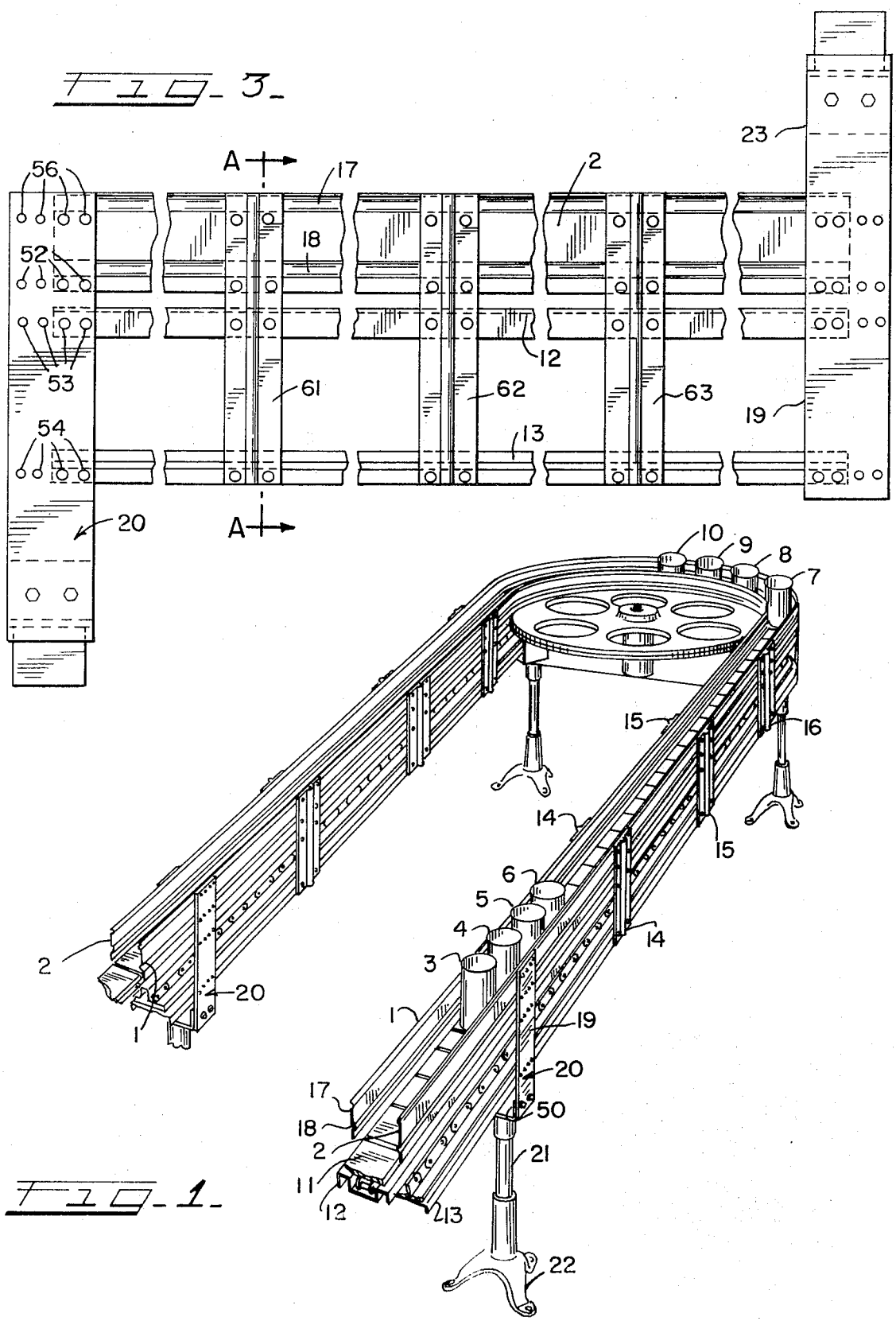
FIG. 1 shows a perspective view of a part of my invention.

The perspective view of FIG. 1 shows paired guides 1, 2 with a series of cans 3–10 being conveyed between them on the conveyor 11. The conveyor is supported by a horizontally disposed conveyor carryway 12 and returns on the horizontal conveyor return support 13. Paired vertical frame member 14, 15, and 16 attach the carryway 12 and return support 13 to the side guide means 1, 2 so that the carryway 12 and return support 13 derive vertical support from the paired guides 1, 2. The frame members give lateral backing support to the guide members 1, 2. The guide members have upper and lower rounded sections 17 and 18.

At appropriate points along the conveyor one of the several pairs 14, 15, 16 of vertical frame members is extended to make a main frame member 21 and a standard 19 is attached to the extended portion 20 of the paired main vertical frame members. The standard may be attached to the floor 22 as shown in FIG. 1. Alternatively, the extended portion 23 of the main frame member 19 also may be above the guide members 1,2 (FIG. 3) and the standard may be attached to an overhead structure such as a ceiling.

Figure 2:
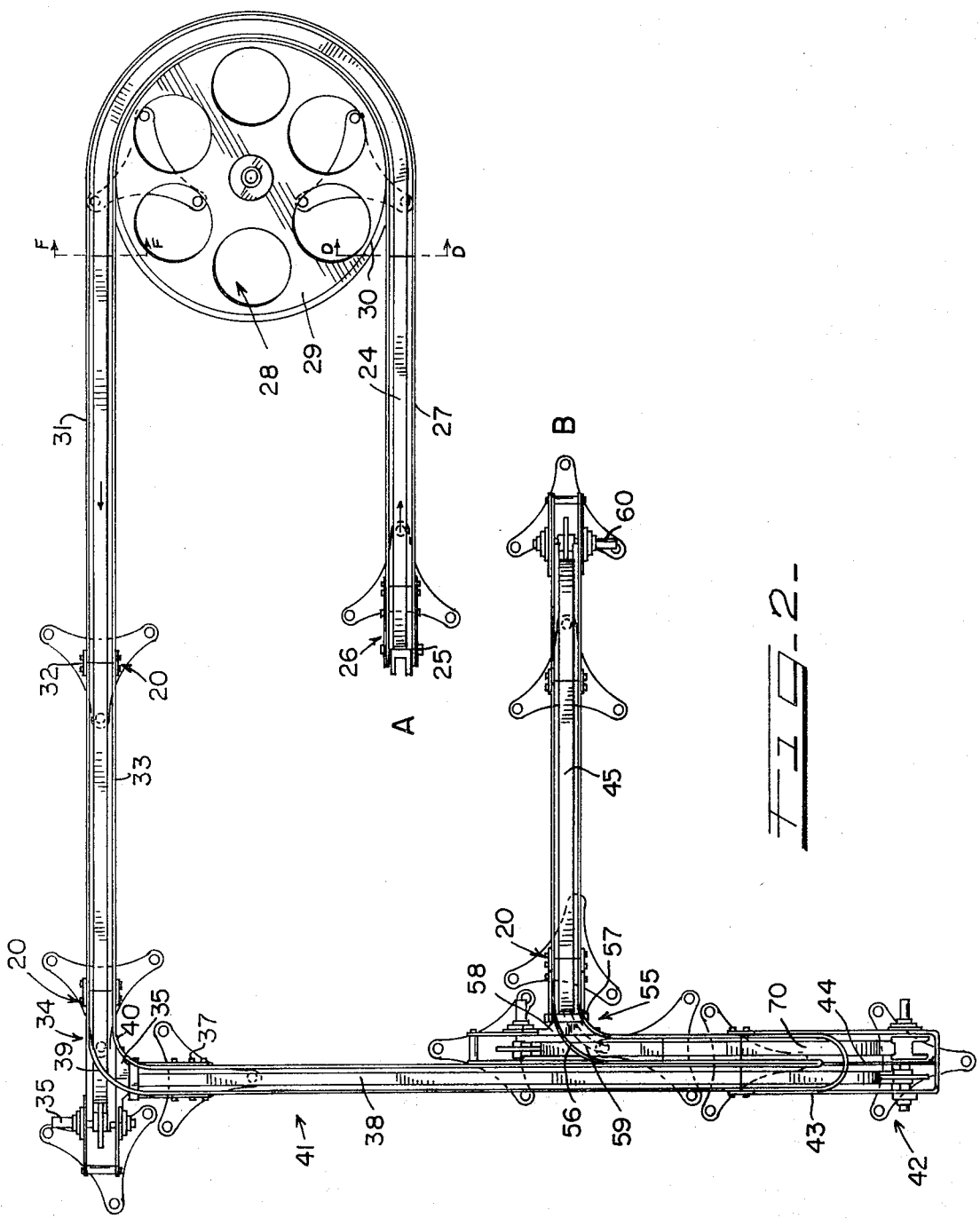
FIG. 2 shows an assembly of unitary modules of my invention.

The conveyor assembly shown in FIG. 2 conveys objects such as a can from station A and delivers it to station B. This assembly is not necessarily taken from any specific can line but merely shows the variety of possibilities to which my modular conveyor is adapted. A slat chain 24 is used such as the one manufactured by Rex Manufacturing Company of Milwaukee, Wisconsin. This chain can be fitted into an insert mounted into the channel of the upper support member. First, next to station A is an end unit 26 having an idler pulley 25 and adjacent to that is a unitary straight section 27 of about ten feet. Down the line after the unitary straight section is a 180 degree turntable 28. The rotatable turntable 28 and disc 29 is used to avoid friction. The disc has a rabbet 30 extending about its periphery. It is of a depth and width to support a conveyor 24. The disc 29 rotates and holds the flexible top chain in the rabbet 30 so that the flexible top chain passes freely around the disc to carry a can around a 180° turn. The can rides on the flexible top chain around this corner and the use of the 180° turntable disc 29 is simply to avoid friction and allow the can line to proceed with a minimum of disturbance. The turntable 28 is a modular section. It begins about the point D—D and ends at about F—F. Next is a modular straight section 31 which is shown as supported at one end by a supporting pole 32. Then comes another modular straight section 33 and then a non-powered 90° turn 34. The 90° turn 34 has a power sprocket means 35 and a transfer dead plate 36 with an idler 37 adapted to support a second chain 38. The first chain travels over the carryway and returns under the carryway 12 (FIG. 1) on the return support assembly from station A to the powered sprocket and back to station A. Between the first chain 24 and the second 38 is a transfer dead plate 36 which supports the can or other object as it passes from the first chain to the second chain. Also, in this space the side rails 39 and 40 are bent to form a smooth curve so that the force of the cans passing along the first section is utilized to push cans over the transfer dead plate area 36. A conveyor 38 such as a flex top chain or some similar chain is provided for the straight section. This straight section 41 is made of modular lengths, each length being about ten feet. The powered end 42 is itself modular and adapted to be fastened to the end of any other modular element.

The next turn in the particular sequence is a 180 degree turn 43. This turn is powered except for the transfer plate 44 located between the two powered chains 38 and 70. Precision holes are drilled in the ends of each of the modular sections to allow splicing. The rails 1,2 are abutted end to end. A small plate may be attached to the exterior of the side rails 1,2 by rivets to fasten the rails together. Preferably, the ends of the modular guide sections have four holes 51–54 (FIG. 3) in each end. Two of these holes 51 are in the upper part of the flat section connecting the upper rail with the lower rail and the other two holes 52 are in the lower flat section which depend from the lower rail. A supporting pole 21 (FIG. 1) with its attached yoke 50 is used to support abutting ends of modular sections wherever possible. The carryway and the return support have two holes on each side in each end. The frame 20 (FIGS. 1 and 3) has series of holes 51–54 drilled in it to match the holes in the abutting modular sections. When rivets fasten the structure together, the structure has very good longitudinal stability because of the distance between the rivets in the rail member.

Intermediate frames 14, 15 and 16 are spaced down the conveyor frame structure between the main frames 20 with their supporting brackets and poles. The momentum of the cans plus an impetus from succeeding cans shoves cans through the 180° turn (FIG. 2). Next is shown a 90 degree live turn 55 to the right. The flex top chain or some similar type conveyor moves straight forward. However, at a position well ahead of the end of the flex top chain, the guide rails 56 and 57 turn right and the can is moved by the flex top chain to the guide rails. The can is then guided across a transfer plate 58 to a lateral flex top chain 45 or other conveyor means. The paired guide rails 56 and 57 are bent and positioned as shown in the drawing. A top rail 59 such as the one shown in phantom lines is used when the can line speed exceeds 2,000 cans per minute. For ordinary speeds less than 2,000, a top rail is not needed. The flex top chain travels between an idler pulley and a powered sprocket 60. The chain 45 travels forward toward the sprocket on an upper conveyor carryway 12 (FIG. 1) and returns on a conveyor return support means 13 (FIG. 1) toward the idler. In the configuration shown in FIG. 2, powered sprockets are at points 35, 42 and 60.

The straight section shown in FIG. 3 has an upper extended portion 23 at the right for hanging and for purposes of illustration a lower extended portion 20 at the left for floor support. The vertical guide means 2 has two rounded portions 17 and 18. The conveyor carryway 12 extends horizontally below the vertical guide means. The flat topped horizontal conveyor return support 13 is mounted below the carryway. The carryway 12 and return support structure 13 are suspended from the vertical guide means by frame elements 61–63.

All punched holes are precision located and make the joining of these modules, in the field, by pop rivets a simple task which may be accomplished by unskilled labor. Traditional fitting and bending to make smooth transitions from section to section is no longer necessary.

The conveyor has a cross-section such as that shown in one of the embodiments of FIGS. 4, 5 and 6. This conveyor is adapted to be preassembled in modules at the factory.

The side guide member 2, conveyor carryways 12, and the conveyor return supports 13 shown in the FIGURES are fabricated of rolled sections made of thin material. A roller contoured pattern provides the maximum rigidity for minimum weight. The components and sections are joined primarily by rivets. The side guide members 1, 2 are spaced right and left and as a can passes down through these guide members, it usually has point contact from time to time with one or the other side. This contact is limited to a point and does not extend for a surface or line contact. Since the side guide member or rail extends the total length of each modular unit, it is used to fasten modular units together. A splice 20, such as shown in FIG. 1, is placed between adjacent guides so they abut one against the other. Guide members 1, 2 are made thin to facilitate forming by rolling. However, the guide members have a vertical dimension thirty or more times the thickness of the material. This dimension provides vertical rigidity to the guide member and allows it to give support to the conveyor carryway 12 and conveyor return support members 13. Intermediate frames 14, 15 and 16 located between the main frames 20 at the supporting poles provide a supporting link between the guide members and the carryway and the return support. The intermediate frame 14 being attached to the guide members 1, 2, the carryway 12 and the return support 13 contributes to the lateral stability of the guide members.

The provision of two vertically spaced contact points or rails 17 and 18 along the guide members keeps cans in an upright position as they proceed along the conveyor. The vertical spacing of the rounded sections which form the contact points or rails of the guide members allows a variety of sizes of cans to be passed through a single pair of guide members. This is because a can which strikes against a guide member does not fall over so long as the center of percussion of the can lies between the point of contact of the can with the upper and lower rails 17 and 18 of the buide member. The center of percussion is that point of an object where if a force is applied, the object moves in translation only and not in rotation. It is thus apparent that if a can or other object strikes against paired rails and its center of percussion lies below the contact point with the lower rail then the can falls backward. If the center of percussion is above the upper rail, then the can tends to fall forward. In the case of vertically spaced double rails, the vertical latitude permissible for the center of percussion is considerable. For this reason, the instant apparatus accomodates a variety of sizes of cans or other objects.

The upper conveyor carryway shown in FIGS. 4, 5 and 6 provides lateral support for the frame members which are distributed from point to point along the conveyor. As shown in FIG. 4, an insert 64 for a honed chain can be provided in the groove 65 of the chain carryway. This conveyor carryway groove may have a variety of inserts mounted on it. The inserts 64 and 66 (FIGS. 4 and 6) are shown as not quite contacting the sides of the groove. However, for extra lateral structural rigidity, they can be proportioned so as to slip snugly into the groove. The inserts extend along the groove through the entire length of the conveyor. The inserts are made of a low friction material such as a high molecular weight polyethylene. Shown below the conveyor carryway 12 is the conveyor return support 13. The return support 13 is a sheet metal member which provides further structural rigidity to the conveyor system. The conveyor return support extends through the conveyor system and returns the chain to its original point. Mounted on the conveyor return support shown in FIG. 5 is a low friction member 67 similar to the member mounted on the carryway above. This low friction member extends along the total length of the conveyor (FIG. 5) just as the insert member extends the full length of the groove (FIGS. 4 and 6) which passes through the conveyor.

FIG. 5 shows a provision for a slat chain. The chain return support shown in FIG. 5 is merely a flat member, and the slat chain slides top down or face down on the flat member. A polyrite wear strip 67 may be attached to the return support. It is not contemplated that this flat member will be greased or oiled in any way.

The next figure, shown as FIG. 6, has a cable mounted in a friction-free insert 66. This cable moves along just above the level of the top of the channel 65 so that the cable has a frictional contact with the can or other object being conveyed from Position A to Position B.

An advantage of my modular construction is that when a force is applied to the center portion of a modular section, the upper members are placed into compression and the lower members are placed into tension. Thus, the lower member functions as a return support and as a tension element if one considers the structure as a supporting framework. The upper member functions as a compression element as well as a guide. Because of the box-like cross-section of the vertical upper members, guides, and the horizontal carryway, this member is well adapted to withstand compressive force. Thus, all of the elements of a conveyor serve several functions as exemplified above.

Since the modular elements of my apparatus are adapted to be placed in close contact one with the other, there are minimal dead plates found in any assembly made from my modular device. Accurate guide rail configurations assure smooth passage of objects, eliminates stoppage of work, affords easy maintenance and allows pre-assembly and exacting assembly at the factory cite.

A variety of conveyors are provided. Because of the groove extending longitudinally down the median line of the carryway, it is possible to use inserts for any of a variety of conveyors or conveyor chains. Chain jerking is eliminated by precise lengths and smooth lateral transfer from chain to chain and chain to disc. The inserts are made of rigid material having the properties of high tensile strength and low coefficient of friction. The conveyors have the characteristics of ease of installation and ease of maintenance. The entire apparatus may be made of a plastic material if one so desires.

Further advantage of this apparatus is that it provides a live modular conveyor which may be varied by various types of cable or chain in the groove portion of the conveyor.

A further advantage of a rigid construction which is made of light rolled flat stock. Another advantage is high vertical structural rigidity because of the high cross-sectional modular rigidity of the guide members and a high lateral structural rigidity because of the high cross-sectional modular rigidity of the lateral guide members.

The foregoing is a description of an illustrative embodiment of the invention, and it is applicant's intention in the appended claims to cover all forms which fall within the scope of this invention.

I claim:

1. A conveyor frame structure for the passage of objects from one location to another comprising:
    paired side guide means each extending along the length of the conveyor frame structure for supporting the rest of said frame and for guiding objects as they pass down the length of the conveyor frame structure;
    a plurality of pairs of vertical frame members each having an upper portion and a lower portion and spaced from each other down the length of the conveyor frame structure;
    fastening means for attaching each of said vertical frame members to a side guide means;
    a horizontal conveyor carryway disposed along the length of said conveyor frame structure and comprising a single sheet of material extending laterally from vertical frame member to vertical frame member;
    paired fastening means for attaching each of said plurality of pairs of vertical frame members to opposed sides of said horizontal conveyor carryway;
    a conveyor return support member made of one continuous sheet of material mounted below and extending longitudinally the length of said conveyor carryway and extending laterally from vertical frame member to vertical frame member; and
    paired fastening means for attaching each vertical frame member of said pairs of vertical frame members to said conveyor return support member.

2. A conveyor frame structure for the passage of objects from one location to another as set forth in claim 1 in which said plurality of pairs of vertical frame members comprise:
    paired intermediate vertical frame members which extend from the top of said said guide means to the bottom of said return support means, and
    paired main frame members attached at the ends of said side guide means, said conveyor carryway and said conveyor return support and extending beyond the rest of said conveyor frame structure whereby a yoke may be attached to paired extensions of said main frame member and a standard may be attached to said yoke for supporting said conveyor frame structure.

3. A conveyor frame structure for the passage of objects from one location to another as set froth in claim 1 in which said paired guide means comprise:
    an upper rounded section, a lower rounded section; and a first flat portion intermediate said upper and lower rounded sections whereby said horizontal conveyor carryway is supported vertically by said paired guide means.

4. A conveyor frame structure for the passage of objects from one location to another as set forth in claim 3 in which said paired guide means further comprises:

a second flat portion below said lower rounded section.

5. A conveyor frame structure for the passage of objects from one location to another as set forth in claim 4 in which said fastening means for attaching each of said vertical frame members to a side guide means comprises:

a first fastening means connecting the upper portion of said first flat portion to an upper portion of one of said pair of vertical frame members, and a second fastening means connecting said second flat portion to one of said pair of vertical frame members whereby said conveyor frame structure is strengthened against flexure along its length.

6. A conveyor frame structure for the passage of objects from one location to another as set forth in claim 5 in which said fastening means for attaching each of said vertical frame members to a side guide means comprises:

first hole means through the upper part of the first flat portion, second hole means through each vertical frame member to match said first hole means, rivets through said first hole means and said second hole means for holding said first flat portion and said vertical frame member together, third hole means through said second flat portion, fourth hole means through each said vertical frame member to match said third hole means, rivets through said third hole means and said fourth hole means for holding said second flat portion and said vertical frame member together whereby said guide means and said vertical frame members are prevented from moving in relation to each other.

7. A conveyor frame structure for the passage of objects from one location to another as set forth in claim 1 in which said horizontal carryway comprises:

an elongated horizontal plate element, a groove adapted to hole an extension of a slat chain and extending along the median line of the length of said horizontal plate element.

8. A conveyor frame structure for the passage of objects from one location to another as set forth in claim 7 comprising further:

an insert in said groove for carrying a conveyor along the length of said conveyor carryway.

9. A conveyor frame structure for the passage of objects from one location to another comprising:

a conveyor carryway horizontally disposed along the length of said conveyor frame structure, comprising:

a U-shaped channel integral with said carryway located medially of said carryway whereby a conveyor is held in a middle position on said carryway, paired laterally extending flat sections connected each to one side of said U-shaped channel whereby a bearing surface may be formed for said conveyor, angle means located along the edge of said paired lateral flat elements, and opposed vertical frame means at spaced intervals along the length of the conveyor frame structure, means for attaching said angle means of said conveyor carryway to said frame means, a flat topped horizontal conveyor return support means mounted below said conveyor carryway, extending along the length of said conveyor and attached to each of said pairs of vertical frame members whereby said conveyor carryway, said conveyor return support means and said opposed vertical frame means form a structure which is rigid laterally, paired guide means each being integral and extending along the length of said modular conveyor frame structure and having a first end and a second end and each comprising:

an upper rounded section, a lower rounded section, a first flat portion intermediate said upper and lower rounded section, a second flat portion below said lower rounded section, and means for fastening each said opposed vertical frame to one of said guide means at a point on said first flat portion near to said upper rounded section and at a point on said second flat portion whereby longitudinal rigidity is imparted to said conveyor frame structure.

10. A conveyor frame structure for the passage of an object from one location to another as set forth in claim 9 comprising further:

an insert adapted to fit into said U-shaped channel and made of high density, low friction material, and having an upper surface, a groove in said upper surface of said insert and extending in a direction along the length of said U-shaped channel whereby a cable may ride in said groove of said insert and be used as a conveyor.

11. A conveyor frame structure for the passage of an object from one location to another as set forth in claim 9 comprising further:

an insert adapted to fit into said U-shaped channel and made of high density, low friction material and having an upper surface, a groove extending along said upper surface for providing a bearing surface for a honed chain to act as a conveyor for said object.

12. A conveyor frame structure for the passage of objects from one location to another comprising:

a conveyor carryway horizontally disposed along the length of said conveyor frame structure, comprising:

a U-shaped channel integral with said carryway located medially of said carryway whereby a conveyor is held in a middle position on said carryway, paired laterally extending flat sections connected each to one side of said U-shaped channel whereby a bearing surface is formed for said conveyor, angle means located along the edge of said paired lateral flat elements; and opposed vertical frame means at spaced intervals along the length of the conveyor frame structure, means for attaching said angle means of said conveyor carryway to said frame means, a flat topped horizontal conveyor return support means mounted below said conveyor carryway, extending along the length of said conveyor and attached to each of said pairs of vertical frame members whereby said conveyor carryway, said conveyor return support means and said opposed vertical frame means form a structure which is rigid laterally, paired guide means each being integral and extending along the length of said modular conveyor frame structure and having a first end and a second end and each comprising:

an upper rounded section, a lower rounded section, a first flat portion intermediate said upper and lower rounded section, a second flat portion below said lower rounded section, and means for fastening each said opposed vertical frame to one of said guide means at a point on said first flat portion near to said upper rounded section and at a point on said second flat portion whereby longitudinal and tortional rigidity is imparted to said conveyor frame structure.

* * * * *